(12) United States Patent
Hidaka

(10) Patent No.: US 11,807,222 B2
(45) Date of Patent: Nov. 7, 2023

(54) PARKING ASSISTANCE DEVICE

(71) Applicant: DENSO CORPORATION, Kariya (JP)

(72) Inventor: Takamasa Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 45 days.

(21) Appl. No.: 17/399,775

(22) Filed: Aug. 11, 2021

(65) Prior Publication Data

US 2021/0370918 A1 Dec. 2, 2021

Related U.S. Application Data

(63) Continuation of application No. PCT/JP2020/008060, filed on Feb. 27, 2020.

(30) Foreign Application Priority Data

Mar. 1, 2019 (JP) ................. 2019-037868

(51) Int. Cl.
 | | |
 |---|---|
 | *B60W 30/06* | (2006.01) |
 | *G08G 1/0968* | (2006.01) |
 | *G08G 1/14* | (2006.01) |

(52) U.S. Cl.
CPC ....... *B60W 30/06* (2013.01); *G08G 1/096844* (2013.01); *G08G 1/141* (2013.01); *G08G 1/146* (2013.01)

(58) Field of Classification Search
CPC . B60W 30/06; G08G 1/096844; G08G 1/141; G08G 1/146
See application file for complete search history.

(56) References Cited

U.S. PATENT DOCUMENTS

| | | | |
|---|---|---|---|
| 10,821,845 B2* | 11/2020 | Penilla | G06Q 30/0645 |
| 2004/0128062 A1* | 7/2004 | Ogino | G01C 21/3697 |
| | | | 455/414.1 |
| 2015/0247733 A1* | 9/2015 | Horihata | G09B 29/106 |
| | | | 701/410 |

(Continued)

FOREIGN PATENT DOCUMENTS

| | | |
|---|---|---|
| CN | 101813492 A | 8/2010 |
| CN | 102226933 A | 10/2011 |

(Continued)

*Primary Examiner* — Mohamed Barakat
(74) *Attorney, Agent, or Firm* — Harness, Dickey & Pierce, P.L.C.

(57) ABSTRACT

A parking assistance device includes a traveling route setting unit, a traveling route supply unit, an information acquiring unit, and a determination unit. The traveling route setting unit is configured to set a traveling route from a position of a vehicle to a parking spot in a parking lot. The traveling route supply unit is configured to supply information indicating the traveling route to the vehicle. The information acquiring unit is configured to acquire situation information containing the position of the vehicle and a situation of the parking lot. The determination unit is configured to determine whether the traveling route needs to be reset based on the situation information. When the determination unit determines that the traveling route needs to be reset, the traveling route setting unit resets the traveling route based on the situation information, and the traveling route supply unit supplies information indicating the reset traveling route.

15 Claims, 5 Drawing Sheets

(56) References Cited

U.S. PATENT DOCUMENTS

| | | | | |
|---|---|---|---|---|
| 2016/0063862 A1* | 3/2016 | Rosen | ................... | G06Q 10/02 340/932.2 |
| 2017/0270796 A1 | 9/2017 | Kawagishi | | |
| 2019/0287400 A1* | 9/2019 | Cao | ....................... | G08G 1/142 |
| 2019/0337506 A1* | 11/2019 | Shima | ..................... | G08G 1/00 |
| 2019/0353497 A1 | 11/2019 | Murashita | | |
| 2019/0382002 A1* | 12/2019 | Yamazaki | ............ | G05D 1/0297 |

FOREIGN PATENT DOCUMENTS

| | | |
|---|---|---|
| CN | 108399784 A | 8/2018 |
| JP | 200271369 A | 3/2002 |
| JP | 2011054116 A | 3/2011 |
| JP | 2017211715 A | 11/2017 |
| JP | 2018073269 A | 5/2018 |
| JP | 2018124416 A | 8/2018 |
| WO | WO-2016147368 A1 | 9/2016 |
| WO | WO-2017168754 A1 | 10/2017 |
| WO | WO-2018163817 A1 | 9/2018 |

* cited by examiner

PARKING ASSISTANCE DEVICE

CROSS REFERENCE TO RELATED APPLICATION

The present application is a continuation application of International Patent Application No. PCT/JP2020/008060 filed on Feb. 27, 2020, which designated the U.S. and claims the benefit of priority from Japanese Patent Application No. 2019-037868 filed on Mar. 1, 2019. The entire disclosures of all of the above applications are incorporated herein by reference.

TECHNICAL FIELD

The present disclosure relates to a parking assistance device.

BACKGROUND

A general parking lot management device is configured to set a traveling route from an entrance position to a parking spot and supply information indicating the set traveling route to an automated vehicle. The automated vehicle automatically drives toward the parking spot by following the traveling route. The automated vehicle parks when it arrives at the parking spot.

SUMMARY

According to an aspect of the present disclosure, a parking assistance device includes a traveling route setting unit, a traveling route supply unit, an information acquiring unit, and a determination unit. The traveling route setting unit is configured to set a traveling route from a position of a vehicle having an automated driving function to a parking spot in a parking lot. The traveling route supply unit is configured to supply information indicating the traveling route set by the traveling route setting unit to the vehicle. The information acquiring unit is configured to acquire situation information containing the position of the vehicle and a situation of the parking lot while the vehicle is traveling on the traveling route. The determination unit is configured to determine whether the traveling route needs to be reset based on the situation information. When the determination unit determines that the traveling route needs to be reset, the traveling route setting unit resets the traveling route based on the situation information, and the traveling route supply unit supplies information indicating the reset traveling route to the vehicle. the determination unit is configured to determine that the traveling route needs to be reset when the parking spot is occupied by another vehicle or a state of a section closer to the position of the vehicle than the parking spot changes from an occupied state where the section is occupied by another vehicle to an empty state where the section is empty.

According to another aspect of the present disclosure, a parking assistance device includes at least one processor and at least one memory, the memory storing instructions configured to, when executed by the at least one processor, cause the at least one processor to set a traveling route from a position of a vehicle having an automated driving function to a parking spot in a parking lot. The instructions is configured to cause the at least one processor to supply information indicating the traveling route to the vehicle. The instructions is configured to cause the at least one processor to acquire situation information containing the position of the vehicle and a situation of the parking lot while the vehicle is traveling on the traveling route; The instructions is configured to cause the at least one processor to determine whether the traveling route needs to be reset based on the situation information. The instructions is configured to cause the at least one processor to, when the traveling route needs to be reset, reset the traveling route based on the situation information and supply information indicating the reset traveling route to the vehicle. The instructions is configured to cause the at least one processor to, determine that the traveling route needs to be reset when the parking spot is occupied by another vehicle or a state of a section closer to the position of the vehicle than the parking spot changes from an occupied state where the section is occupied by another vehicle to an empty state where the section is empty.

EMBODIMENTS

Figure 1:
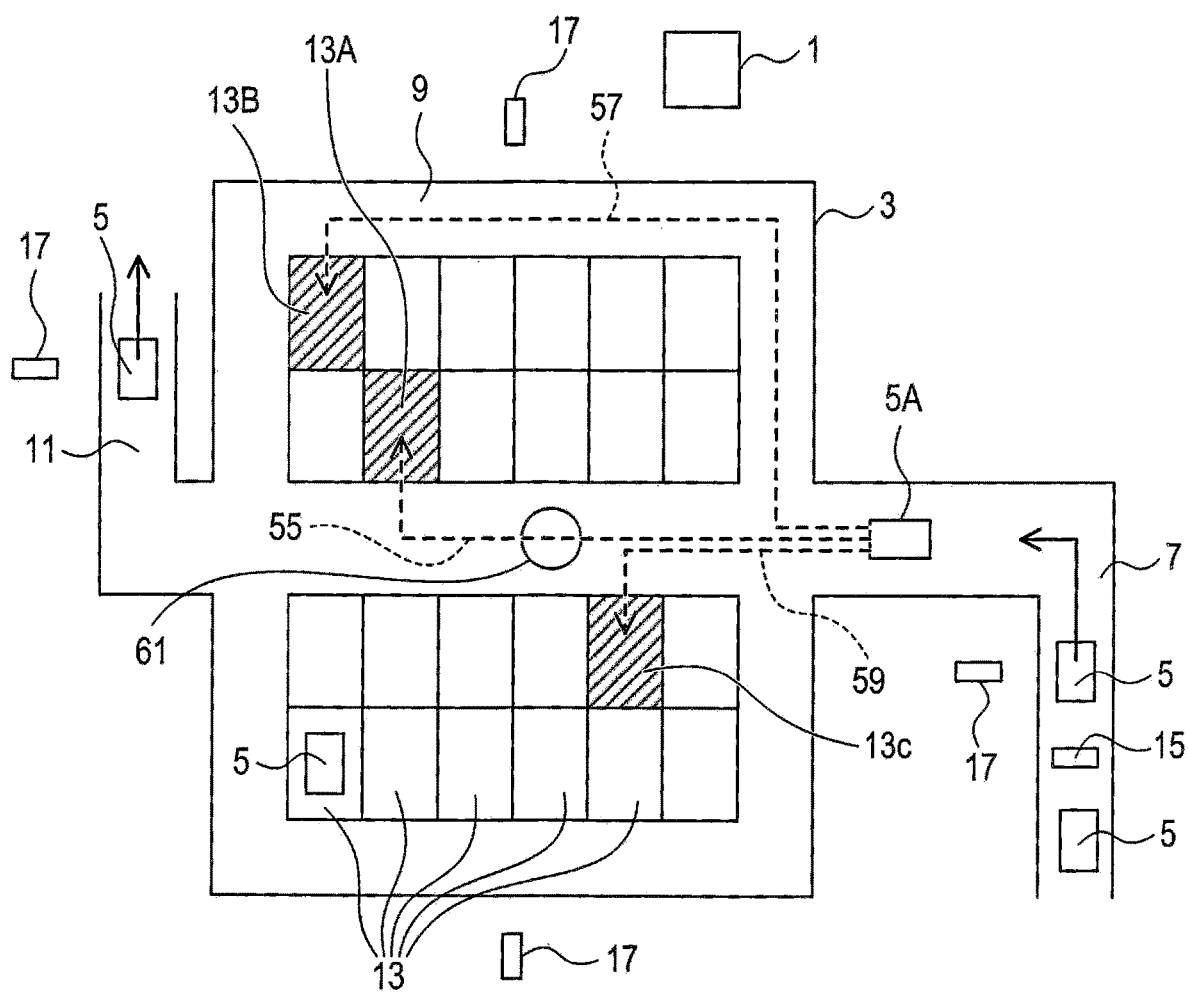
FIG. 1 is a diagram illustrating a parking lot.

The present inventors have studied to find that, in the general parking lot management device, it sometimes becomes difficult for the vehicle to arrive at the firstly set parking spot via the firstly set traveling route after the automated vehicle starts the automated driving.

Exemplary embodiments of the present disclosure will be described with reference to the drawings.

First Embodiment

1. Configuration of Parking Assistance Device 1

The configuration of a parking assistance device 1 will be described with reference to FIGS. 1 to 3. The parking assistance device 1 is configured to assist, for example, automatic parking of a vehicle having automated driving function (hereinafter referred to as an automated vehicle 5) in a parking lot 3 shown in FIG. 1.

The parking lot 3 includes an entrance 7, a parking space 9, and an exit 11. The entrance 7 and the exit 11 continue to the parking space 9. Multiple sections 13 are provided in the parking space 9. Each section 13 is an area in which one automated vehicle 5 can be parked.

A gate 15 is provided at the entrance 7. The gate 15 has an open state and a closed state. When the gate 15 is in the open state, the automated vehicle 5 can pass through the entrance 7. When the gate 15 is in the closed state, the automated vehicle 5 cannot pass through the entrance 7. Multiple cameras 17 are provided in the parking lot 3. The camera 17 is configured to photograph the inside of the parking lot 3 and send the images to the parking assistance device 1.

Figure 2:
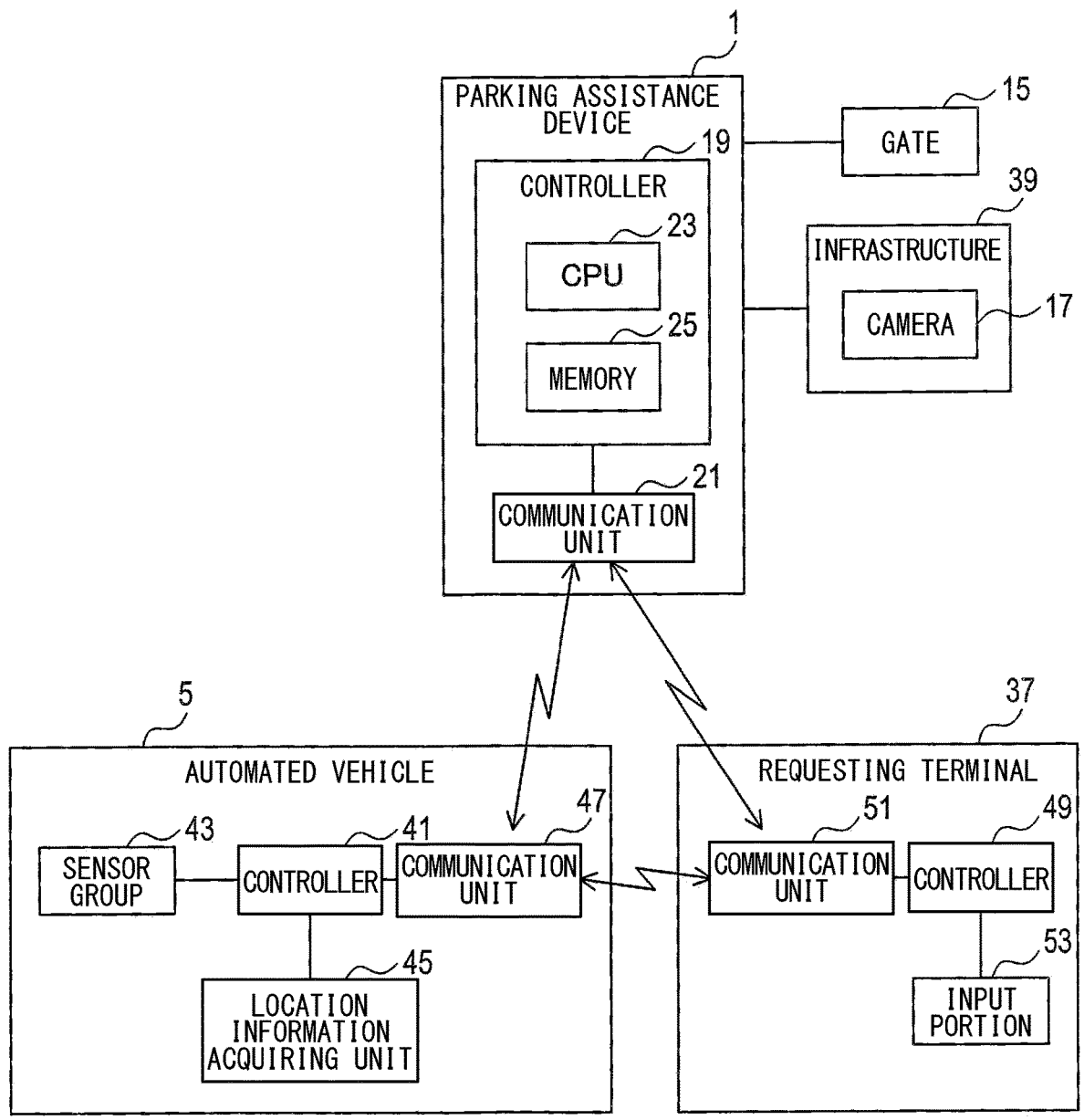
FIG. 2 is a block diagram illustrating a parking assistance device, an automated vehicle, and a requesting terminal.

As shown in FIG. 2, the parking assistance device 1 includes a controller 19 and a communication unit 21. The controller 19 includes a microcontroller having a CPU 23 and a semiconductor memory (hereinafter, a memory 25) such as a RAM and a ROM, for example. The communication unit 21 may be an antenna.

Functions provided by the controller 19 are implemented by the CPU 23 executing a program stored in the non-transitory tangible storage medium. In this example, the memory 25 corresponds to the non-transitory tangible storage medium in which the programs are stored. A method corresponding to the program is executed by the execution of the program. The controller 19 may include one or more microcontrollers.

Figure 3:
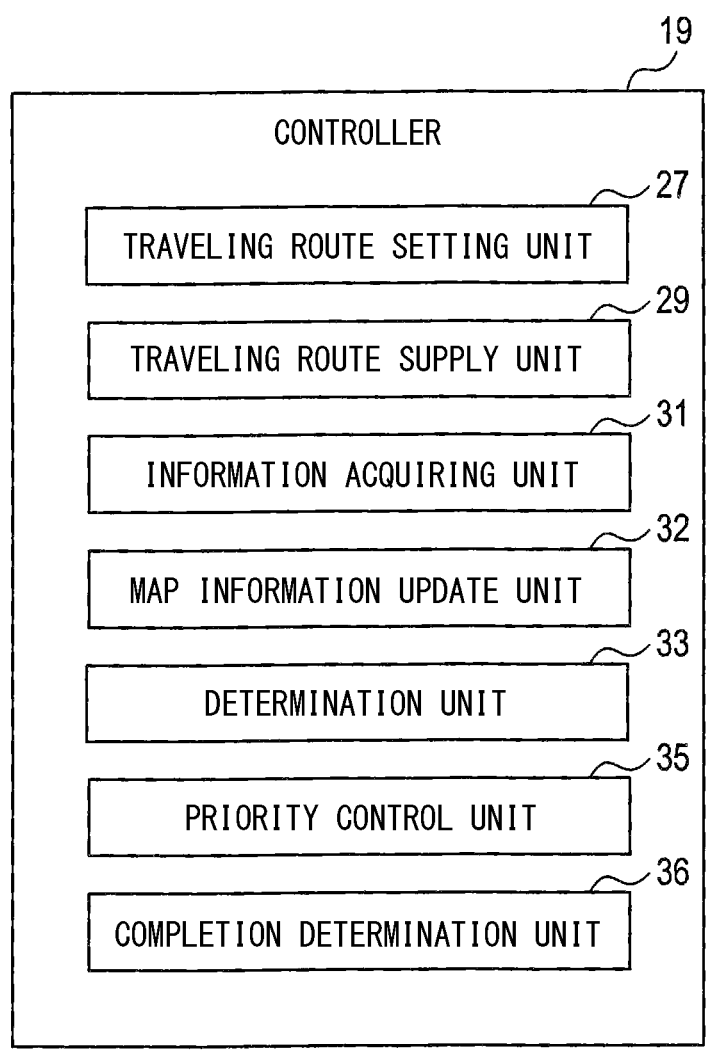
FIG. 3 is a block diagram illustrating a functional configuration of a controller of the parking assistance device.

As shown in FIG. 3, the controller 19 includes a traveling route setting unit 27, a traveling route supply unit 29, an information acquiring unit 31, a map information update unit 32, a determination unit 33, a priority control unit 35, and a completion determination unit 36.

The memory 25 stores map information of the inside of the parking lot 3. The map information contains information indicating positions of obstacles. The map information contains information indicating a state of each section 13. The state of the section 13 includes a state where the section 13 is empty (hereinafter, referred to as an empty state) and a state where the section 13 is occupied by a vehicle (hereinafter, referred to as an occupied state).

The communication unit 21 is configured to communicate with the automated vehicle 5 and a requesting terminal 37 described later. The parking assistance device 1 is configured to control the gate 15. The control method will be described later.

The parking assistance device 1 is configured to acquire, from an infrastructure 39, information indicating a situation of the parking lot 3 (hereinafter, referred to as a parking lot information). The cameras 17 are included in the infrastructure 39. The parking lot information contains, for example, information indicating positions of obstacles, information indicating the state of the section 13, and the like.

The automated vehicle 5 has the capability to automatically drive to a destination by following a traveling route. The automated vehicle 5 uses the map information to perform the automated driving. The automated vehicle 5 includes a controller 41, a sensor group 43, a location information acquiring unit 45, and a communication unit 47. The communication unit 47 may be an antenna.

The controller 41 is configured to control each part of the automated vehicle 5. The function of the automated driving is realized by the control performed by the controller 41. The sensor group 43 is configured to acquire surroundings information indicating a situation around the automated vehicle 5. The surroundings information contains, for example, positions of obstacles around the automated vehicle 5. The sensor group 43 includes a camera, a Lidar, and the like.

The location information acquiring unit 45 is configured to acquire location information of the automated vehicle 5. The location information acquiring unit 45 is a GPU system, for example. The communication unit 47 is configured to communicate with the parking assistance device 1 and the requesting terminal 37.

The requesting terminal 37 is a mobile terminal carried by an occupant of the automated vehicle 5, for example. The requesting terminal 37 may be a stationary terminal provided near the entrance 7 or a terminal attached to the automated vehicle 5, for example. The requesting terminal 37 includes a controller 49, a communication unit 51, and an input portion 53. The communication unit 51 may be an antenna.

The controller 49 is configured to control each part of the requesting terminal 37. The communication unit 51 is configured to communicate with the parking assistance device 1 and the automated vehicle 5. The input portion 53 is configured to accept an input operation by the occupant of the automated vehicle 5. The input portion 53 is, for example, a button-type switch, a touch panel, a mechanism for recognizing a voice instruction, or the like.

2. Driving Assist Process Executed by the Parking Assistance Device 1

The driving assist process executed by the parking assistance device 1 will be described with reference to FIGS. 1, 4. Hereinafter, the automated vehicle 5, which is in the state where the parking assistance device 1 is providing the parking assistance, is referred to as an assisted vehicle 5A. The parking assistance device 1 is configured to start the process shown in FIG. 4 upon receiving an automatic parking request and the location information of the assisted vehicle 5A by the communication unit 21.

The requesting terminal 37 is configured to transmit the automatic parking request by the communication unit 51 upon receiving a predetermined input operation by the occupant of the assisted vehicle 5A to the input portion 53. The assisted vehicle 5A is configured to receive the automatic parking request by the communication unit 47. The assisted vehicle 5A is configured to transmit the location information of the assisted vehicle 5A upon receiving the automatic parking request.

Figure 4:
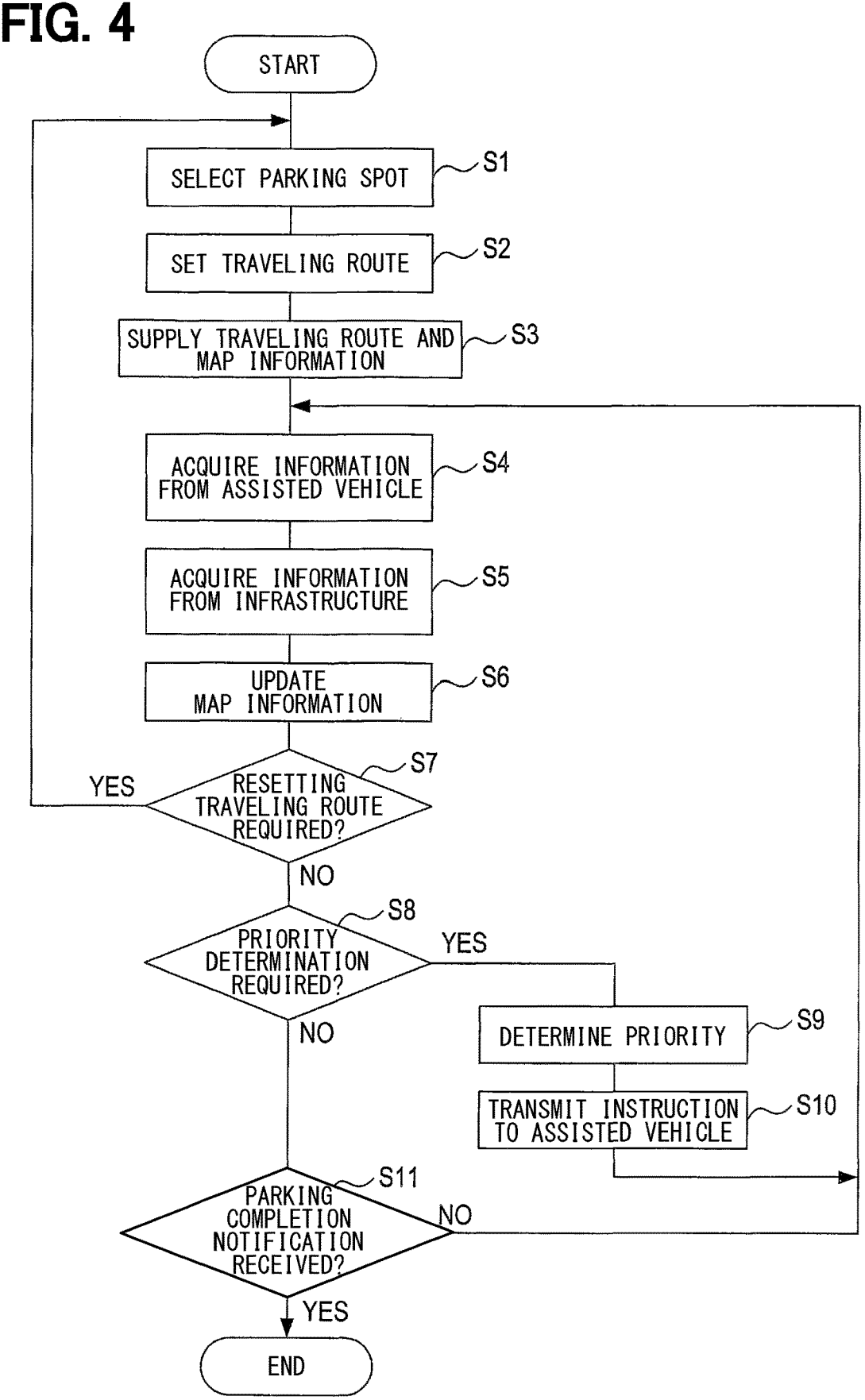
FIG. 4 is a flowchart illustrating a process executed by the controller of the parking assistance device.

In step S1 shown in FIG. 4, the traveling route setting unit 27 selects a parking spot. The parking spot is one of the sections 13 in the empty state. The traveling route setting unit 27 is configured to determine the state of each section 13 as follows, for example. When the automated vehicle 5 parks in a certain section 13, it sends identification information of the section 13 and the information of starting parking to the parking assistance device 1. Further, when the automated vehicle 5 leaves the section 13 in which the automated vehicle 5 previously parked, the automated vehicle 5 transmits the identification information of the section 13 and the information of the end of the parking to the parking assistance device 1.

The traveling route setting unit 27 is configured to determine the state of each section 13 based on the history of the information transmitted from the automated vehicles 5. The traveling route setting unit 27 may be configured to determine the state of each section 13 based on the images from the camera 17.

When only one section 13 is in the empty state, the traveling route setting unit 27 selects the section 13 as the parking spot. When two or more sections 13 are in the empty state, the traveling route setting unit 27 selects one section 13 as the parking spot from the sections 13 in the empty state base on a predetermined criteria. The criteria include, for example, the criteria of selecting the section 13 closest to the entrance 7, the criteria of selecting the section 13 closest to the exit 11, the criteria of selecting the section 13 closest to the current location of the assisted vehicle 5A, and the criteria of selecting the section 13 that is in an area where there is a group of sections 13 in the empty state.

When all the sections 13 are in the occupied state, the traveling route setting unit 27 is configured to predict the section 13 that will become the empty state at earliest timing, and the traveling route setting unit 27 selects the section 13 as the parking spot.

In step S2, the traveling route setting unit 27 sets a traveling route from the current location of the assisted vehicle 5A to the parking spot selected in step S1 by using the map information. The current location of the assisted vehicle 5A is a location indicated by the latest location information received from the assisted vehicle 5A. The traveling route setting unit 27 is configured to set an optimum traveling route based on a predetermined criteria. The predetermined criteria includes, for example, the criteria of shortening the traveling route as much as possible, the criteria of shortening the time required for the assisted vehicle 5A to arrive at the parking spot as much as possible, and the criteria of avoiding places where automated driving is difficult. The places where automated driving is difficult include, for example, narrow aisles and places where there are many other vehicles in motion.

In step S3, the traveling route supply unit 29 transmits information indicating the traveling route set in step S2 (hereinafter, referred to as traveling route information) and the map information by the communication unit 21. As described later, the assisted vehicle 5A receives the traveling route information and the map information. Accordingly, the traveling route supply unit 29 supplies the traveling route information and the map information to the assisted vehicle 5A.

In step S4, the information acquiring unit 31 performs a process of acquiring information from the assisted vehicle 5A. The information acquired from the assisted vehicle 5A includes the location information indicating the latest location of the assisted vehicle 5A and the surroundings information acquired by the assisted vehicle 5A.

In step S5, the information acquiring unit 31 performs a process of acquiring the parking lot information from the infrastructure 39. The parking lot information includes, for example, information indicating positions of obstacles existing in the parking lot 3, information indicating the state of the section 13, and the like.

In step S6, the map information update unit 32 updates the map information based on the information acquired in steps S4 and S5. For example, the map information update unit 32 adds the positions of the obstacles to the map information and updates the positions of the obstacles based on the information acquired in steps S4 and S5. Further, the map information update unit 32 updates the state of the section 13 contained in the map information. For example, the map information update unit 32 updates the state of the section 13 from the empty state to the occupied state. Further, the map information update unit 32 updates the state of the section 13 from the occupied state to the empty state, for example.

In step S7, the determination unit 33 determines whether the traveling route supplied to the assisted vehicle 5A in step S3 needs to be reset based on the information acquired in steps S4 and S5 and the latest map information.

For example, when the current parking spot is occupied by another vehicle, the traveling route needs to be reset. Further, when some part of the traveling route is difficult to drive due to the obstacles or the like, the traveling route needs to be reset. Moreover, when the section 13 at a position preferable to the current parking spot changes from the occupied state to the empty state, the traveling route needs to be reset. The position preferable to the current parking spot may be a position closer to the assisted vehicle 5A than the current parking spot, for example.

When the reset of the traveling route is needed, the process returns to step S1. When the reset of the traveling route is not needed, the process proceeds to step S8. When the process returns to step S1, the traveling route setting unit 27 resets at least the traveling route based on the information acquired in steps S4 and S5 and the latest map information. The traveling route setting unit 27 resets the parking spot when the parking spot needs to be reset.

The parking spot is not reset and only the traveling route is reset when: the current parking spot is in the empty state; there is no section 13 that is in empty state and preferable to the current parking spot; and some part of the current traveling route is difficult to drive due to the obstacle or the like. The traveling route setting unit 27 resets the traveling route when the parking spot is reset.

For example, suppose that the section 13A shown in FIG. 1 is the current parking spot and the traveling route 55 is the current traveling route. When the section 13A is occupied by another vehicle after the assisted vehicle has started the automated driving, the traveling route setting unit 27 resets a certain section 13B in the empty state as new parking spot, and resets new traveling route 57.

When a section 13C located at a position preferable to the section 13A changes from the occupied state to the empty state after the assisted vehicle 5A has started the automated driving, the traveling route setting unit 27 resets the section 13C as new parking spot, and resets new traveling route 59.

When it becomes difficult to follow the traveling route 55 due to the obstacle 61 after the assisted vehicle 5A has started the automated driving, the traveling route setting unit 27 resets new traveling route toward the section 13A and that does not pass through the obstacle 61.

In step S8, the priority control unit 35 determines whether a priority determination is required. The priority determination is a process to determine the order in which the assisted vehicle 5A and another vehicle should pass through a curve, a narrow passage, or the like. When the priority determination is required, the process proceeds to step S9. When the priority determination is not required, the process proceeds to step S11.

In step S9, the priority control unit 35 performs the priority determination based on a predetermined criteria. As a result of the priority determination, the assisted vehicle 5A is determined as a priority vehicle or a non-priority vehicle.

In step S10, the priority control unit 35 transmits an instruction to the assisted vehicle 5A using the communication unit 21. The instruction varies depending on whether the assisted vehicle 5A is the priority vehicle or the non-priority vehicle. When the assisted vehicle 5A is the priority vehicle, the instruction is an instruction to drive. When the assisted vehicle 5A is the non-priority vehicle, the instruction is an instruction to stop. After step S10, the process returns to step S4.

In step 11, the completion determination unit 36 determines whether the communication unit 21 received a parking completion notification. The parking completion notification is a notification transmitted from the assisted vehicle 5A when the assisted vehicle 5A parks at the parking spot. When the communication unit 21 receives the parking completion notification, the process ends. When the communication unit 21 has not received the parking completion notification, the process returns to step S4.

3. Process Performed by the Assisted Vehicle 5A

Figure 5:
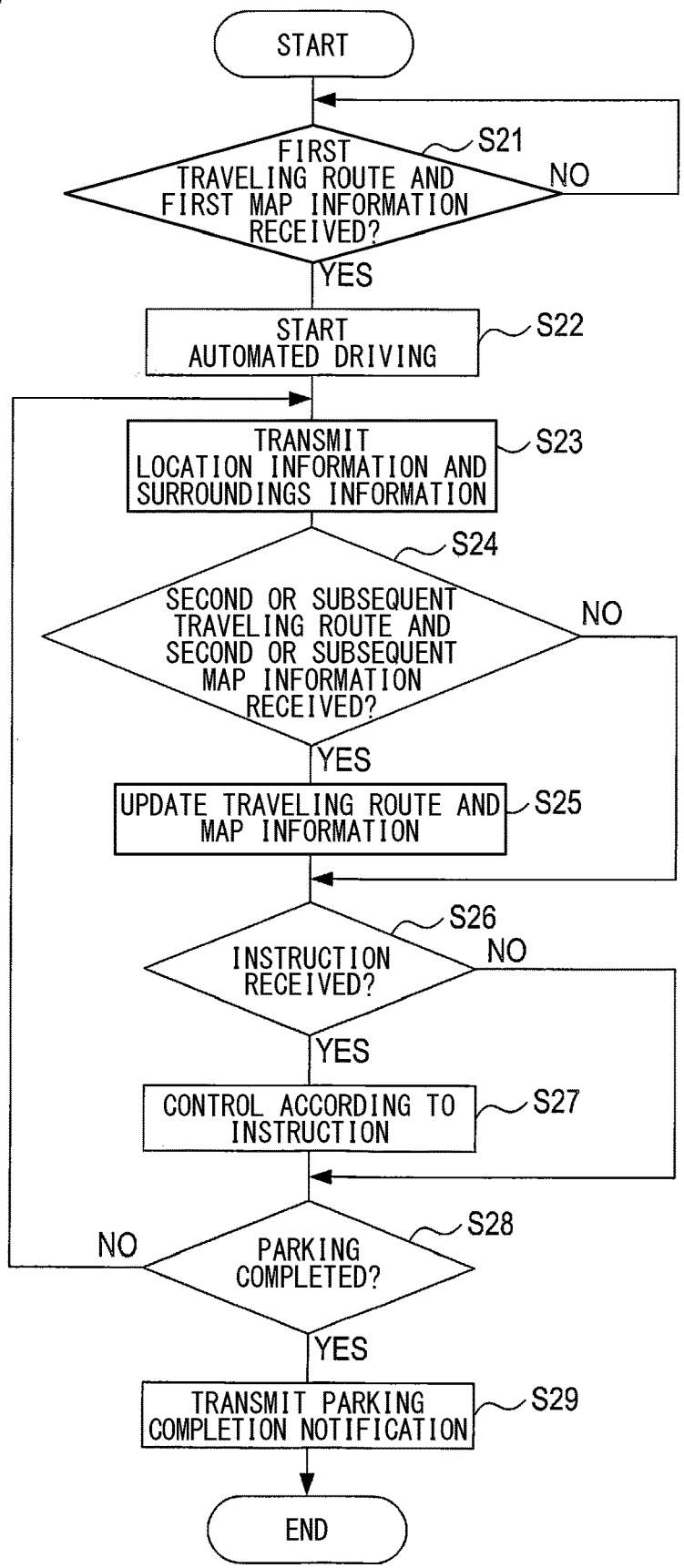
FIG. 5 is a flowchart illustrating a process executed by a controller of the automated vehicle.

The process performed by the controller 41 of the assisted vehicle 5A will be described with reference to FIG. 5. The controller 41 is configured to perform the process shown in FIG. 5 when the controller 41 transmits the location information to the parking assistance device 1 first upon receiving the automatic parking request from the requesting terminal 37.

In step S21, the controller 41 determines whether the communication unit 47 receives a first traveling route information and a first map information. The first traveling route information is the traveling route information supplied when the parking assistance device 1 first performs the process of step S3. The first map information is the map information supplied when the parking assistance device 1 first performs the process of step S3. When the communication unit 47 receives the first traveling route information and the first map information, the process proceeds to step S22. When the communication unit 47 has not received the first traveling route information and the first map information, the process returns to step S21.

In step S22, the controller 41 starts the automated driving using the first traveling route information and the first map information.

In step S23, the controller 41 acquires the location information using the location information acquiring unit 45. Further, the controller 41 acquires the surroundings information using the sensor group 43. Then, the controller 41 transmits the location information and the surroundings information using the communication unit 47. The parking assistance device 1 receives the transmitted location information and surroundings information in step S4.

In step S24, the controller 41 determines whether the communication unit 47 receives a second or subsequent traveling route information and a second or subsequent map information. The second or subsequent traveling route information is the traveling route information supplied when the parking assistance device 1 performs the process of step S3 for a second or subsequent time. The second or subsequent map information is the map information supplied when the parking assistance device 1 performs the process of step S3 for a second or subsequent time. When the communication unit 47 receives the second or subsequent traveling route information and the second or subsequent map information, the process proceeds to step S25. When the communication unit 47 has not received the second or subsequent traveling route information and the second or subsequent map information, the process proceeds to step S26.

In step S25, the controller 41 updates the current traveling route information with the most recently received traveling route information. When the parking spot that is the destination according to the current traveling route information is different from the parking spot that is the destination according to the most recently received traveling route information, the parking spot is necessarily updated as a result of updating the traveling path information.

The controller 41 updates the current map information with the most recently received map information. The controller 41 continues the automated driving using the updated traveling route information and the updated map information.

In step S26, the controller 41 determines whether the communication unit 47 receives the instruction. The instruction is the instruction transmitted by the parking assistance device 1 in step S10.

In step S27, the controller 41 performs the control according to the instruction. For example, when the instruction to drive is received and the assisted vehicle 5A is being stopped, the controller 41 resumes the driving of the assisted vehicle 5A. When the instruction to drive is received and the assisted vehicle 5A is running, the controller 41 continues driving the assisted vehicle 5A.

For example, when the instruction to stop is received and the assisted vehicle 5A is being stopped, the controller 41 continues to stop the assisted vehicle 5A. When the instruction to stop is received and the assisted vehicle 5A is running, the controller 41 stops the assisted vehicle 5A.

In step S28, the controller 41 determines whether the parking has completed. The parking is completed when the assisted vehicle 5A parks in the latest parking spot. When the parking has been completed, the process proceeds to step S29. When the parking has not been completed, the process returns to step S23.

In step S29, the controller 41 transmits the parking completion notification using the communication unit 47. The parking assistance device 1 receives the transmitted parking completion notification.

4. Gate Control Process by the Parking Assistance Device 1

The parking assistance device 1 is configured to determine whether each section 13 is in the empty state as described above. The parking assistance device 1 is configured to open the gate 15 when there is an empty section 13. The parking assistance device 1 is configured to close the gate 15 when all the sections 13 are occupied.

5. Effects of the Parking Assistance Device 1

(1A) The parking assistance device 1 is configured to reset the traveling route as needed while the assisted vehicle 5A is traveling on the traveling route. Accordingly, even when it becomes difficult for the assisted vehicle 5A to arrive at the firstly set parking spot via the firstly set traveling route after the automated driving is started, the assisted vehicle 5A may park at the reset parking spot by following the reset traveling route, for example.

Further, when the parking spot preferable to the firstly set parking spot appears after the automated driving is started, the assisted vehicle 5A may park at the preferable parking spot, for example.

(1B) The parking assistance device 1 is configured to update the map information based on the information acquired from the assisted vehicle 5A and the infrastructure 39. The parking assistance device 1 is configured to determine whether it is necessary to reset the traveling route based on the updated map information. Accordingly, the parking assistance device 1 can properly determine whether it is necessary to reset the traveling route.

(1C) The parking assistance device 1 can set an optimum traveling route based on the predetermined criteria.

(1D) The parking assistance device 1 is configured to acquire at least a part of information from the assisted vehicle 5A. Accordingly, the parking assistance device 1 can properly update the map information and perform the determination in step S7.

(1E) The parking assistance device 1 is configured to acquire at least a part of information from the infrastructure 39. Accordingly, the parking assistance device 1 can properly update the map information and perform the determination in step S7.

Other Embodiments

Although the embodiments of the present disclosure have been described above, the present disclosure is not limited to the embodiments described above, and various modifications can be made to implement the present disclosure.

(1) The assisted vehicle 5A may be configured to transmit the automatic parking request.

(2) The parking assistance device 1 may be configured not to perform the processes of steps S8 to S10. When the determination is negative in step S7, the process may always proceed to step S11.

(3) The information acquired by the parking assistance device 1 from the assisted vehicle 5A may be only the location information. The parking assistance device 1 may be configured not to acquire the information from the infrastructure 39.

(4) The requesting terminal 37 may be configured to automatically transmit the automatic parking request when a predetermined condition is satisfied. The predetermined condition may be, for example, the assisted vehicle 5A arriving at a predetermined location. The predetermined location may be, for example, the entrance 7.

(5) The controller 19 and method described in the present disclosure may be implemented by a special purpose computer which is configured with a memory and a processor programmed to execute one or more particular functions embodied in computer programs of the memory. Alternatively, the controller 19 described in the present disclosure and the method thereof may be realized by a dedicated computer configured as a processor with one or more dedicated hardware logic circuits. Alternatively, the controller 19 and method described in the present disclosure may be realized by one or more dedicated computer, which is configured as a combination of a processor and a memory, which are programmed to perform one or more functions, and a processor which is configured with one or more hardware logic circuits. Further, the computer program may be stored in a computer-readable non-transitory tangible storage medium as instructions to be executed by a computer. The technique for realizing the functions of each unit included in the controller 19 does not necessarily need to include software, and all the functions may be realized using one or a plurality of hardware circuits.

(6) A plurality of functions of one element in the above embodiment may be implemented by a plurality of elements, or one function of one element may be implemented by a plurality of elements. Further, a plurality of functions of a plurality of elements may be implemented by one element, or one function implemented by a plurality of elements may be implemented by one element. A part of the configuration of the above embodiments may be omitted. At least a part of the configuration of the above embodiments may be added to or replaced with another configuration of the above embodiments.

(7) In addition to the above-described parking assistance device, the present disclosure may be realized by various features such as a system including the parking assistance device as a component, a program for functioning the computer to provide the parking assistance device, a non-transitory tangible storage medium such as a semiconductor memory storing the program, a parking assistance method or the like.

What is claimed is:

1. A parking assistance device comprising:
    a traveling route setting unit configured to set a traveling route from a position of a vehicle having an automated driving function to a parking spot in a parking lot;
    a traveling route supply unit configured to supply information indicating the traveling route set by the traveling route setting unit to the vehicle;
    an information acquiring unit configured to acquire position information of the vehicle transmitted from the vehicle and situation information containing a situation of the parking lot transmitted from infrastructure installed in the parking lot while the vehicle is traveling to the parking spot with the automated driving function according to the traveling route received from the traveling route supply unit;
    a priority control unit configured to determine whether a priority determination is required; and
    a determination unit configured to determine whether the traveling route needs to be reset based on the position information and the situation information after the vehicle starts automated driving to the parking spot according to the traveling route, wherein
    when the determination unit determines that the traveling route needs to be reset, the traveling route setting unit resets the traveling route based on the position information and the situation information, and the traveling route supply unit supplies information indicating the reset traveling route to the vehicle,
    the determination unit is configured to determine that the traveling route needs to be reset when
        a state of a section closer to the position of the vehicle than the parking spot changes from an occupied state where the section is occupied by another vehicle to an empty state where the section is empty after the vehicle starts the automated driving, and
    the priority control unit is further configured to
        transmit an instruction to the vehicle to drive when it is determined in the priority determination that the vehicle is a priority vehicle, and
        transmit an instruction to the vehicle to stop when it is determined in the priority determination that the vehicle is a non-priority vehicle.

2. The parking assistance device according to claim 1, further comprising:
    a storage unit configured to store map information of the parking lot, the map information containing information indicating position of an obstacle in the parking lot and information indicating a state of a section in the parking lot; and
    a map information update unit configured to update the map information of the parking lot based on the position information of the vehicle and the situation information received from the information acquiring unit, wherein
    the determination unit is configured to determine whether the traveling route needs to be reset based on the updated map information.

3. The parking assistance device according to claim 2, wherein
    the map information update unit is configured to at least add a position of an obstacle to the map information based on the situation information, or
    update the position of the obstacle in the map information based on the situation information.

4. The parking assistance device according to claim 1, further comprising:
    a completion determination unit configured to determine whether the parking assistance device receives form the vehicle a parking completion notification, which indicates that the vehicle has parked at the parking spot with the automated driving function, wherein
    the traveling route setting unit is configured to set an optimum traveling route based on a predetermined criteria, and
    the information acquiring unit acquires the position information of the vehicle and the situation information of the parking lot, and the determination unit determines whether the traveling route needs to be reset before the completion determination unit determines that the parking assistance device has received the parking completion notification from the vehicle.

5. The parking assistance device according to claim 1, wherein
    the information acquiring unit is configured to acquire at least a part of the situation information from the vehicle.

6. The parking assistance device according to claim 1, wherein
    the information acquiring unit is configured to acquire at least a part of the situation information from an infrastructure provided in the parking lot.

7. The parking assistance device according to claim 1, wherein
the priority control unit is further configured to determine which of the vehicle or another vehicle has priority in the traveling route.

8. The parking assistance device according to claim 1, wherein the priority determination determines an order for the vehicle and an additional vehicle to pass through at least one of a curve and a narrow passage and the priority control unit is further configured to perform the priority determination based on a predetermined criteria.

9. The parking assistance device according to claim 1, wherein
the priority control unit transmits a drive instruction to a processor mounted in the vehicle when it is determined in the priority determination that the vehicle is a priority vehicle, and transmits a stop instruction to the processor of the vehicle when it is determined in the priority determination that the vehicle is a non-priority vehicle, and
the parking assistance device opens a gate of the parking lot when there is a section in an empty state in the parking lot.

10. A parking assistance device comprising at least one processor and at least one memory, the memory storing instructions configured to, when executed by the at least one processor, cause the at least one processor to:
set a traveling route from a position of a vehicle having an automated driving function to a parking spot in a parking lot;
supply information indicating the traveling route to the vehicle;
acquire position information of the vehicle transmitted from the vehicle and situation information containing a situation of the parking lot transmitted from infrastructure installed in the parking lot while the vehicle is traveling to the parking spot with the automated driving function according to the traveling route received from the traveling route supply unit;
determine whether the traveling route needs to be reset based on the position information and the situation information after the vehicle starts automated driving to the parking spot according to the traveling route;
when the traveling route needs to be reset, reset the traveling route based on the position information and the situation information and supply information indicating the reset traveling route to the vehicle;
determine that the traveling route needs to be reset when a state of a section closer to the position of the vehicle than the parking spot changes from an occupied state where the section is occupied by another vehicle to an empty state where the section is empty after the vehicle starts the automated driving;
determine whether a priority determination is required;
transmit an instruction to the vehicle to drive when it is determined in the priority determination that the vehicle is a priority vehicle; and
transmit an instruction to the vehicle to stop when it is determined in the priority determination that the vehicle is a non-priority vehicle.

11. The parking assistance device recited by claim 10 wherein the priority determination determines an order for the vehicle and an additional vehicle to pass through at least one of a curve and a narrow passage and wherein the instructions are further configured to, when executed by the at least one processor, cause the at least one processor to perform the priority determination based on a predetermined criteria.

12. A parking assistance device comprising:
a traveling route setting unit configured to set a traveling route from a position of a vehicle having an automated driving function to a parking spot in a parking lot;
a traveling route supply unit configured to supply information indicating the traveling route set by the traveling route setting unit to the vehicle;
an information acquiring unit configured to acquire position information of the vehicle and situation information containing a situation of the parking lot while the vehicle is traveling to the parking spot with the automated driving function according to the traveling route received from the traveling route supply unit; and
a determination unit configured to determine whether the traveling route needs to be reset based on the position information and the situation information after the vehicle starts automated driving to the parking spot according to the traveling route, wherein
when the determination unit determines that the traveling route needs to be reset, the traveling route setting unit resets the traveling route based on the position information and the situation information, and the traveling route supply unit supplies information indicating the reset traveling route to the vehicle,
the determination unit is configured to determine that the traveling route needs to be reset when a state of a section closer to the position of the vehicle than the parking spot changes from an occupied state where the section is occupied by another vehicle to an empty state where the section is empty after the vehicle starts the automated driving.

13. The parking assistance device according to claim 12, further comprising:
a storage unit configured to store map information of the parking lot, the map information containing information indicating position of an obstacle in the parking lot and information indicating a state of a section in the parking lot; and
a map information update unit configured to update the map information of the parking lot based on the position information of the vehicle and the situation information received from the information acquiring unit, wherein
the determination unit is configured to determine whether the traveling route needs to be reset based on the updated map information.

14. The parking assistance device according to claim 12, wherein
the information acquiring unit acquires the position information transmitted from the vehicle, and
the information acquiring unit acquires as the situation information of the parking lot, information containing a situation of the parking lot transmitted from an infrastructure installed in the parking lot.

15. A parking assistance system configured to assist for a parking of a vehicle having an automated driving function comprising:
a parking assistance device according to claim 12; and
a vehicle configured to automatically drive to a parking spot in a parking lot, wherein
the vehicle includes a communication unit configured to communicate with the parking assistance device and receive information indicating the traveling route, which set by the traveling route setting unit, the vehicle includes a controller configured to control the vehicle to automatically drive to the parking spot according to the traveling route, and the vehicle includes a location information acquiring unit configured to acquire the position information of the vehicle, wherein the controller is configured to transmit the position information to the parking assistance device through the communication unit after the vehicle starts to automatically drive to the parking spot according to the traveling route.

\* \* \* \* \*